Aug. 7, 1951 V. L. HEEREN 2,562,913

LOW-FREQUENCY PULSE RATE INDICATOR

Filed Jan. 3, 1947

INVENTOR.
VERNON L. HEEREN

BY M. Q. Hayes

ATTORNEY

Patented Aug. 7, 1951 2,562,913

UNITED STATES PATENT OFFICE 2,562,913

LOW-FREQUENCY PULSE RATE INDICATOR

Vernon L. Heeren, Washington, D. C.

Application January 3, 1947, Serial No. 719,979

4 Claims. (Cl. 175—368)

(Granted under the act of March 3, 1883, as amended April 30, 1928; 370 O. G. 757)

This invention relates to frequency indicating means and more particularly to pulse rate indicating apparatus having quick response to rate changes.

An object of this invention is to provide a new and improved method of and means for indicating the frequency of a recurring signal.

Another object of this invention is to provide a frequency indicating system having rapid response characteristics to changes in input frequencies.

Another object of this invention is to provide a continuously reading frequency indicating system that will not pulsate or flicker at low frequencies.

Other objects and advantages of the invention will become apparent from the following detailed description and the drawings wherein.

Figure 1:
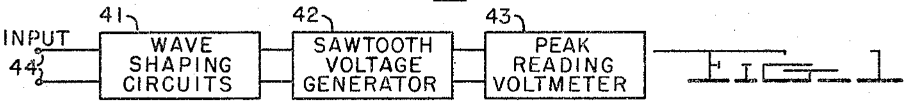
Figure 1 is a block diagram of an exemplary embodiment of the invention.

Referring to Figure 1 there is shown a simplified block diagram of one embodiment of the invention, comprising a suitable wave shaping circuit 41, a sawtooth voltage generator 42 and a peak reading voltmeter 43.

The wave shaping circuit 41 incorporates means well known to the art for changing an incoming signal, to one having a waveform suitable for the operation of the sawtooth generator 42. For instance, in the event a sine wave input is impressed on the input terminals 44 the wave shaping circuit 41 may include an overdriven amplifier stage arranged to convert the input signal to a symmetrical square wave and then to the form suitable for the operation of the sawtooth generator as shown hereafter in Figure 2.

The sawtooth voltage generator 42 is of the type which is operative in response to the output from the wave shaping circuit 41 to produce a sawtooth voltage wave whose period is equal to that of the incoming signal, and whose amplitude rises steadily over its duration. Thus the peak amplitude of the sawtooth voltage is directly proportional to the period of the incoming signal or inversely proportional to the input frequency. Accordingly by providing an indication of the peak amplitude of the output of the sawtooth generator 42, such as by the peak reading voltmeter circuit 43, an indication of the frequency of the input signal is obtained.

Figure 2:
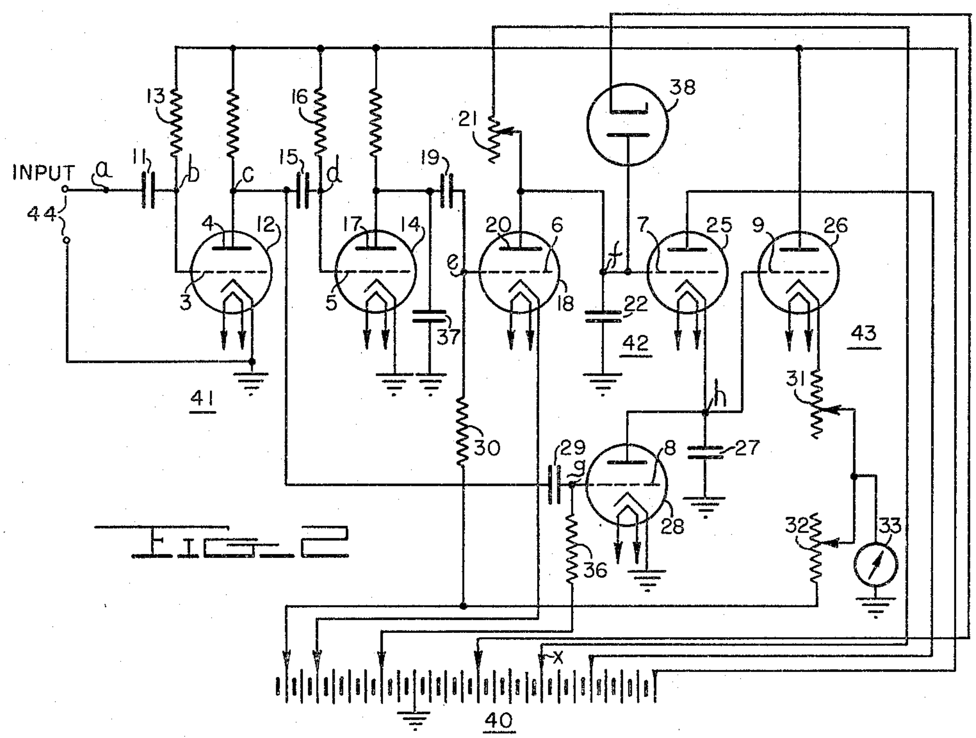
Figure 2 is a schematic diagram of the embodiment shown in Figure 1.

Referring to Figure 2, a typical embodiment of the invention, which for purposes of illustration is arranged to operate in response to either a square wave or a negative pulse input, is illusrated in detail. It being understood that by the addition of an overdriven amplifier stage, for instance, the frequency of a sine wave input may be indicated, with equal convenience.

As herein shown, vacuum tube components 12 and 14 represent the wave shaping circuits shown at 41. The vacuum tube 18 and condenser 22 shown in general at 42 represent the sawtooth voltage generator. The vacuum tube components 25, 26, and 28 and meter 33 shown in general at 43 represent the peak reading voltmeter.

The purpose of the waveform shaping circuit 41 is to produce at the input to the sawtooth generator tube 18 a positive pulse of constant amplitude and width once each cycle of the recurring signal.

Figure 3:
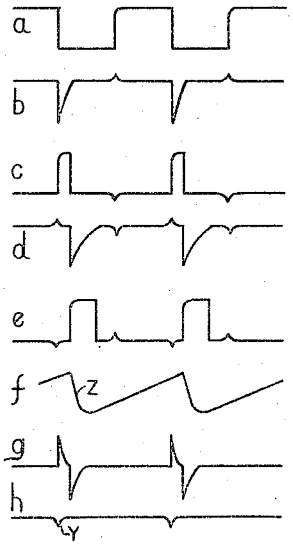
Figure 3 shows a series of waveforms useful in explaining the operation of the circuit shown in Figure 2.

For purposes of explanation of operation the action of the sawtooth voltage generator will be first considered. Reference is also had to Fig. 3, wherein a series of voltage waveforms are drawn to represent the variations in voltage at certain selected points in the circuit of Fig. 2 during a cycle of operation thereof. Identical letters of the alphabet are used to identify the several waveforms and the points of the circuit at which such waveforms would be observed during operation.

In the quiescent state of the circuit, tube 18 of the sawtooth generator 42 is normally biased-non-conducting by way of the negative potential applied to its grid 6 through resistance 30. In this condition the potential at the plate of tube 18 which is applied through potentiometer 21, and therefore the voltage charge developed across the shunt connected condenser 22 is normally that provided by tap X; on supply potential 40. Upon application at point *e* to the grid 6 of tube 18, of a positive pulse, such as that represented by waveform *e* of Fig. 3; tube 18 is rendered conducting and condenser 22 is rapidly discharged therethrough as illustrated at Z in waveworm *f* of Fig. 3. Thereafter, condenser 22 charges in a positive direction through potentiometer 21 and at a predetermined rate dependent upon the setting of the movable tap on potentiometer 21. Since, as aforementioned, the grid of tub 18 receives a positive pulse as shown at waveform *e* once each cycle of the input signal applied to the terminals 44, a sawtooth waveform as illustrated by waveform *f* will be produced across condenser 22.

The peak value of this sawtooth voltage is a function of its period, which is equal to the period of the input signal. Therefore the peak value of the sawtooth voltage will be inversely proportional to the input signal frequency.

The sawtooth voltage developed across condenser 22 is applied to the grid 7 of vacuum tube 25. The cathode of tube 25 is returned to ground potential through condenser 27, and is also connected to the anode of tube 28, and to the grid 9 of tube 26.

Diode 38, connected in the grid circuit of tube 25, is a protective device having its anode connected to the grid 7 of tube 25 and its cathode to a source of positive voltage 40. The purpose of this diode is to prevent condenser 22 from charging to such a high voltage when no input signal is applied, as to damage tube 26.

As the sawtooth voltage rises on the grid of tube 25, the condenser 27 remains charged at substantially the peak value of the sawtooth voltage of the preceding cycle as shown by waveform *h*. Condenser 27 has no discharge path except through tube 28, when it conducts, therefore condenser 27 will keep the grid 9 of tube 26 at the peak value of the preceding cycle, causing a continuous current to flow through tube 26 and meter 33. In case the frequency increases and the peak value applied to grid 9 of tube 26, should not be as large as that of the preceding cycle, the grid 9 would not decrease in value unless condenser 27 were first partially discharged and subsequently charged to a new peak value. Therefore, it is provided that condenser 27 discharge partially as indicated at *y* in waveform *h* once each cycle just before the sawtooth voltage reaches its peak value. This action is accomplished in a manner to be more fully described hereinafter.

In the waveshaping circuit 41, tube 12 is normally conducting having its grid 3 returned to a positive source of voltage 40, through resistor 13 which together with condenser 11 forms a differentiating circuit. The input wave, which for purposes of illustration has been represented as a square wave as shown by waveform *a*, is differentiated giving rise to the sharp negative pips shown by waveform *b* at the grid 3 of tube 12. The sharp negative pips cutoff tube 12 momentarily, giving rise to the positive pulses of waveform *c* at the anode 4 of tube 12. The amplitude of these pulses is limited by the positive source of voltage 40.

The positive pulses of waveform *c* are applied to the grid 5 of tube 14 through coupling condenser 15. The grid 5 of tube 14 is returned to a positive source of voltage 40 through resistor 16. Consequently, grid 5 will go only slightly positive during the existence of the pulses of waveform *c* and during which time condenser 15 will charge negatively. At the end of the pulse waveform c, the grid 5 of tube 14 will be driven sharply negative as shown by waveform *d*. As it does so, tube 14 is rendered non-conducting for approximately the period required for condenser 15 to discharge through resistor 16 and thereby produces the positive pulses of waveform *e* at its plate. The amplitude of these pulses is fixed by the plate supply potential of tube 14 while their duration is held constant by the fact that the amplitude of the output signal from tube 12 is held constant and the discharge of condenser 15 through resistance 16 is fixed.

The circuit for partially discharging storage condenser 27 once each cycle of the input, and thereby to render the system rapidly responsive to changes in input frequency, includes tube 28, the input to which is taken from the plate of tube 12. As shown by waveform *g* a sharp positive voltage pulse is applied to the grid 8 of tube 28, just before the peak value of the sawtooth voltage is reached causing it to conduct momentarily, thus discharging condenser 27 partially from the peak value of the previous cycle. Condenser 27 then charges to the peak value of the new cycle giving rise to the waveform *h*, which is a steady voltage on the grid 9 of tube 26 except for a slight readjustment each cycle.

The sharp positive voltage of waveform *g* is generated by the differentiating circuit comprising condenser 29 and resistor 36 from the positive pulse of waveform *c* produced at the plate of tube 12. This sharp positive voltage is generated by the incoming signal and occurs just before the sawtooth voltage reaches its peak value.

Therefore, if the frequency increases the frequency indication will follow quickly because of this feature of condenser 27 discharging partially once each cycle. If the frequency decreases the indication will also follow quickly as the condenser 27 will readily follow any increase in voltage on the grid 7 of tube 25.

Tube 26 acts as a peak reading voltmeter, it has a milliammeter 33 in its cathode ground return circuit. The voltage appearing on the grid 9 of tube 26 is substantially equal to the peak voltage of the sawtooth of the preceding cycle, and it is a steady voltage except for a small correction each cycle, as shown in Fig. 3*h*. Therefore the current through the meter 33 will be a continuous reading, even at low pulse rates, and will be a direct function of the input frequency.

The purpose of potentiometers 31 and 32 is to enable the meter 33, which may be directly calibrated in terms of frequency, to read directly proportionally to the pulse rate i. e. give an increased reading with increase of pulse rate, and to set the upper and lower limits of the meter calibration. Potentiometer 32 is the adjustment for the maximum meter current i. e. max. expected pulse rate, and potentiometer 31 is the adjustment for the minimum meter current i. e. minimum expected pulse rate.

From the foregoing discussion it is apparent that considerable modification of the features of this invention is possible, and while the device herein described and the form of apparatus for the operation thereof, constitutes a preferred embodiment of the invention it is to be understood that the invention is not limited to this precise device and form of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A frequency indicating device comprising, a sawtooth voltage generator, operative in response to an input signal applied thereto to produce a uniformly rising voltage waveform whose peak amplitude is proportional to the period of said input signal, capacitative storing means coupled to said generator and adapted to accumulate a voltage proportional to the peak amplitude of said waveform, means operative in response to said input signal for partially discharging said capacitative storing means, each cycle of said signal, peak voltage measuring means coupled to said capacitative storing means for indicating the peak amplitude of the voltage across said capacitative storing means and thereby the frequency of said input signal.

2. A frequency indicating device comprising, a sawtooth voltage generator, operative in response to an input signal applied thereto to produce a uniformly rising voltage waveform whose peak amplitude is proportional to the period of said input signal, capacitative storing means coupled to said generator and adapted to accumulate a voltage proportional to the peak amplitude of said waveform, an electron discharge device connected in shunt with said capacitative storing means, said electron discharge device being operative in response to said input signal, for partially discharging said capacitative storing means, once each cycle of said input signal, immediately preceding the attainment of the peak amplitude of said sawtooth voltage, and peak voltage meansuring means coupled to said capacitative storing means for indicating the magnitude of the voltage across said capacitative storing means and thereby the frequency of said input signal.

3. A frequency indicating device, comprising a resistance capacitance charging circuit, a source of direct voltage connected to said charging circuit to supply a charging voltage therefor, a signal input channel including a discharge path coupled to the capacitance of said charging circuit, said input channel being operative responsive to an input signal applied thereto to effect a discharge of the capacitance of said charging circuit, a storage capacitor, means coupling said storage capacitor to the capacitance of said charging circuit operative to charge said storage capacitor up to a voltage corresponding to the peak voltage developed across the capacitance of said charging circuit, means including said input channel operative responsive to an input signal to partially discharge said storage capacitor once each cycle of the input signal, and a voltage indicator device coupled to said storage capacitor to indicate the peak voltage thereacross and thereby the frequency of said input signal.

4. A pulse frequency indicator comprising, an input signal channel providing two output pulses for each input pulse applied thereto, one of said output pulses corresponding in time to the leading edge of the input pulse and the other output pulse being slightly delayed therefrom, a resistor, a capacitor and a source of direct voltage connected in series to provide a charging circuit, a space discharge path shunting said capacitor, means coupling said other output pulse from said input signal channel to said discharge path to effect a discharge of said capacitor once each cycle of the input pulse, a storage capacitor, means coupling said storage capacitor to the capacitor of said charging circuit operative to charge said storage capacitor up to a voltage equal to the peak voltage developed across the capacitor of said charging circuit, a second space discharge path shunting said storage capacitor, means rendering said second discharge path operative to effect a partial discharge of said storage capacitor in response to said one output pulse from said input signal channel, and a voltage indicator device coupled to said storage capacitor to measure the voltage developed thereacross and thereby the frequency of said input signal.

VERNON L. HEEREN.

REFERENCES CITED

The following references are of record in the file of this patent:

UNITED STATES PATENTS

| Number | Name | Date |
|---|---|---|
| 2,110,015 | Fitzgerald | Mar. 1, 1938 |
| 2,113,011 | White | Apr. 5, 1938 |
| 2,431,591 | Snyder | Nov. 25, 1947 |
| 2,457,676 | Holmes | Dec. 28, 1948 |